United States Patent
Ko

[11] Patent Number: 6,152,464
[45] Date of Patent: Nov. 28, 2000

[54] LOCKING MECHANISM OF FOLDABLE GOLF CARTS

[76] Inventor: Chin-Sung Ko, No. 27-1, Lane 188, Sec. 3, Chin Mar Road, Changhua City, Taiwan

[21] Appl. No.: 09/095,560

[22] Filed: Jun. 11, 1998

[51] Int. Cl.[7] .................................................. B62B 1/00
[52] U.S. Cl. ........................ 280/47.315; 280/DIG. 6; 280/646; 280/655
[58] Field of Search .......................... 280/513, DIG. 6, 280/16, 24, 42, 645–46, 652; 24/339, 170, 485, 489, 492, 499, 508; 292/67, 238, 246, 247, 304

[56] References Cited

U.S. PATENT DOCUMENTS

| | | |
|---|---|---|
| 4,869,526 | 9/1989 | Blake ....................................... 280/652 |
| 4,936,598 | 6/1990 | Lee .......................................... 280/645 |
| 5,249,822 | 10/1993 | Wu .......................................... 280/646 |
| 5,333,023 | 7/1994 | Oxford ....................................... 354/81 |
| 5,526,894 | 6/1996 | Wang ....................................... 280/652 |
| 5,678,842 | 10/1997 | Hook et al. .............................. 280/646 |
| 5,683,195 | 11/1997 | Liao ........................................ 280/646 |

*Primary Examiner*—J. J. Swann
*Assistant Examiner*—James S. McClellan
*Attorney, Agent, or Firm*—Rosenberg, Klein & Lee

[57] ABSTRACT

A locking mechanism of a foldable golf cart includes an elastic retainer cooperated with an engagement element provided on the upper portion of the support post of a golf cart to achieve an effective coupling through a simple operation. With this arrangement, the engagement between the parts will not loosen with ease. Thus the locking mechanism according to the invention can provide convenience in use and better stability.

4 Claims, 5 Drawing Sheets

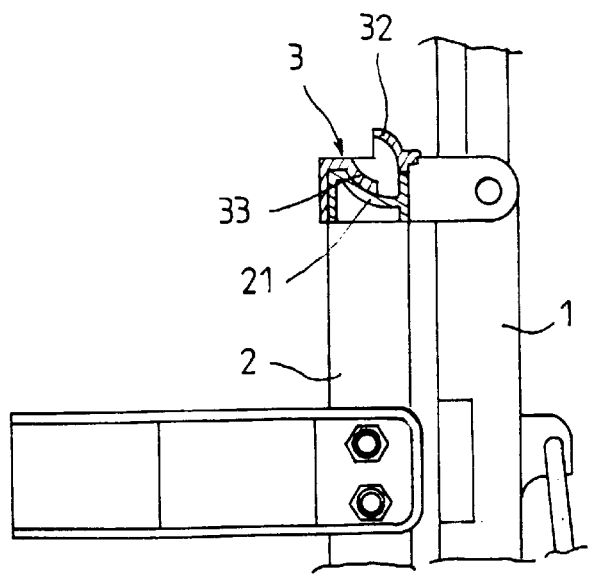
F I G. 2

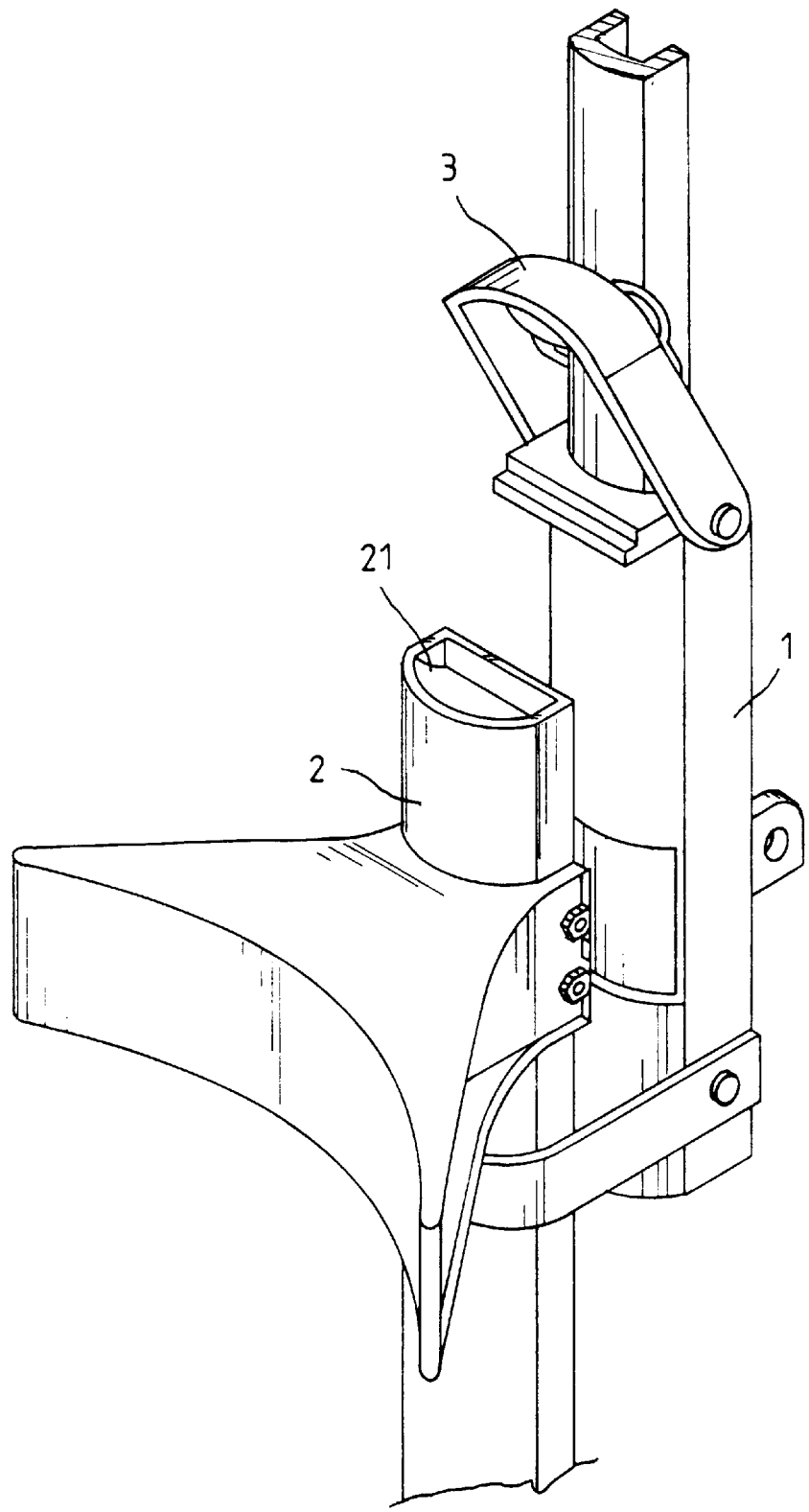
F I G. 3

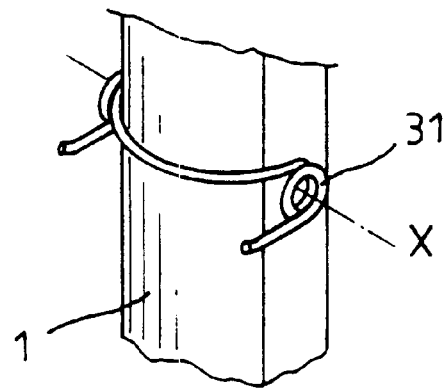
F I G. 6
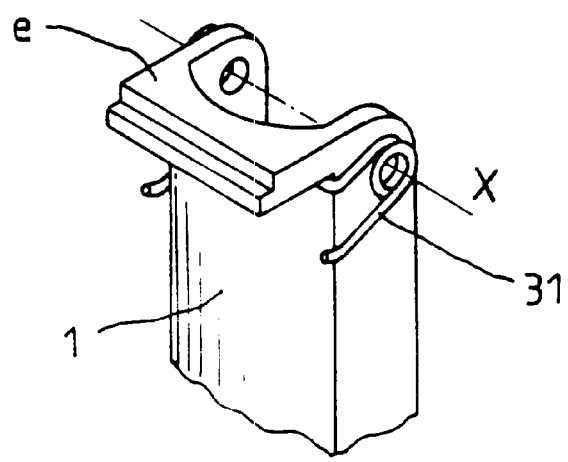
F I G. 7

LOCKING MECHANISM OF FOLDABLE GOLF CARTS

BACKGROUND OF THE INVENTION

A conventional locking mechanism of foldable golf carts principally contains a gripping portion (11) disposed on one side of a handle bar (1) of a golf cart. As shown in FIG. 1, the gripping portion extends inwardly to form a stop portion (12). A spring (13) is disposed between the stop portion (12) and the handle bar (1) to provide elastic forces. The elastic forces help the gripping portion (11) catch the upper portion of the support bar (2) to reach a ready-to-use state. Although the conventional locking mechanism can obtain a coupling effect, such a connection is not reliable and it might come apart when the golf cart is dragged on green. In addition, when users want to disconnect the engagement, they need to press the stop portion (12) toward the handle bar (1), which is not the way that people can apply forces with maximum efficiency. To make the cart change from a collapsed state to a developed state, users must press the stop portion (12) to make the gripping portion (11) move outwards first, and then catching the support bar is possible. Such an operation brings inconvenience to users.

Based on the above description, the primary object of the invention is to provide an improved locking mechanism that employs a retainer cooperated with an engagement element provided on the upper portion of the support post of a golf art to give a stable engagement and to provide convenience in use. Now the detailed structure and other features of the invention will become more readily apparent from the following detailed description of the preferred embodiment thereof when taken in conjunction with the accompanying drawings.

BRIEF DESCRIPTION OF ACCOMPANYING DRAWINGS

FIG. 2 is a cross-sectional view of the locking mechanism according to the present invention.

FIG. 3 is a perspective view of the locking mechanism of FIG. 2.

Figure 5:
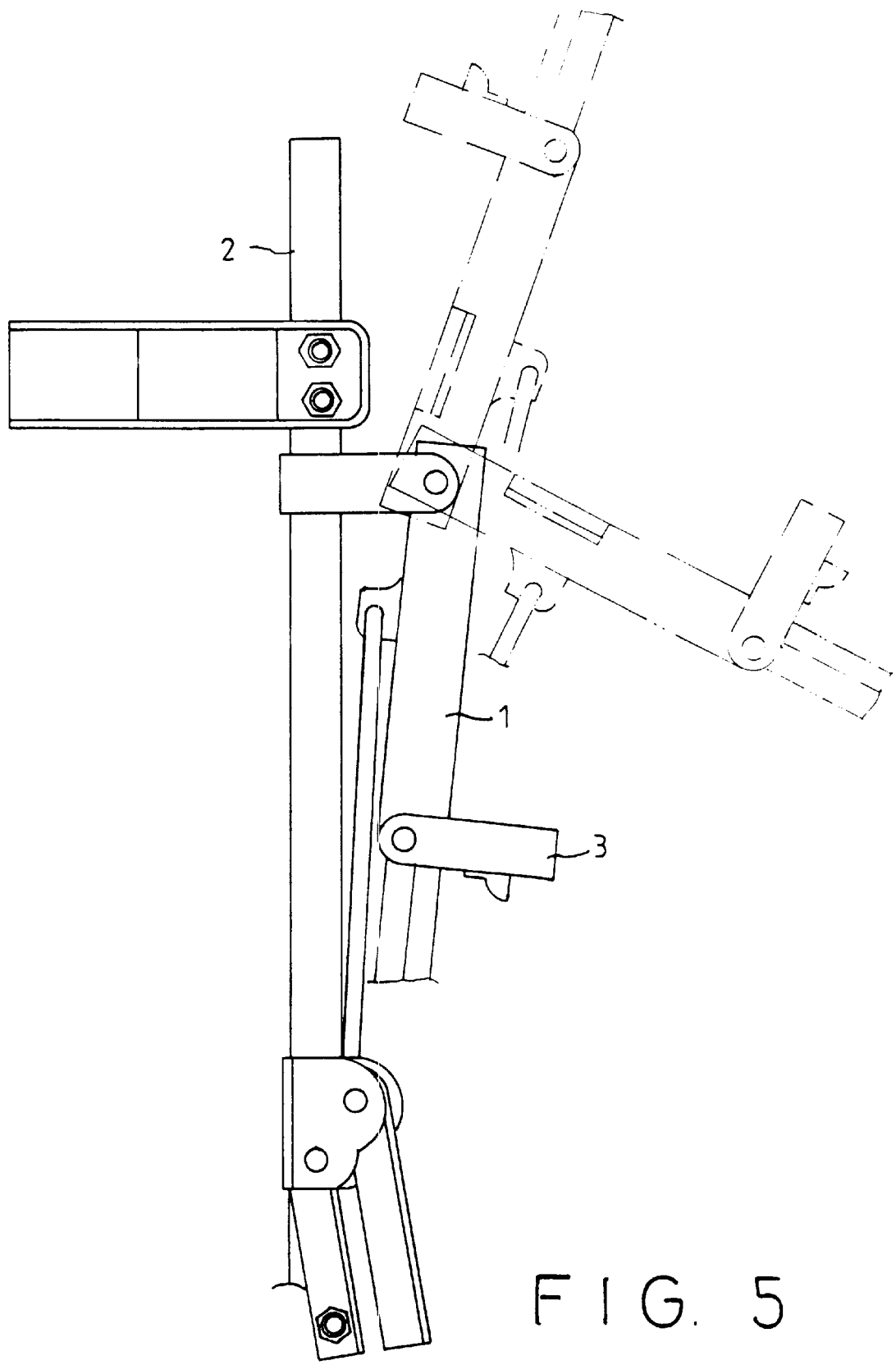

FIG. 5 schematically shows the movement of the locking mechanism according to the invention.

FIG. 6 is an illustrative perspective view, partially cut-away, of an isolated portion of the locking mechanism of FIG. 2, shown with other visually obstructing portions cut-away.

FIG. 7 is an illustrative perspective view, partially cut-away, of the portion shown in FIG. 6, but with the visually obstructing portions shown in place.

DETAILED DESCRIPTION OF PREFERRED EMBODIMENTS

Figure 1:
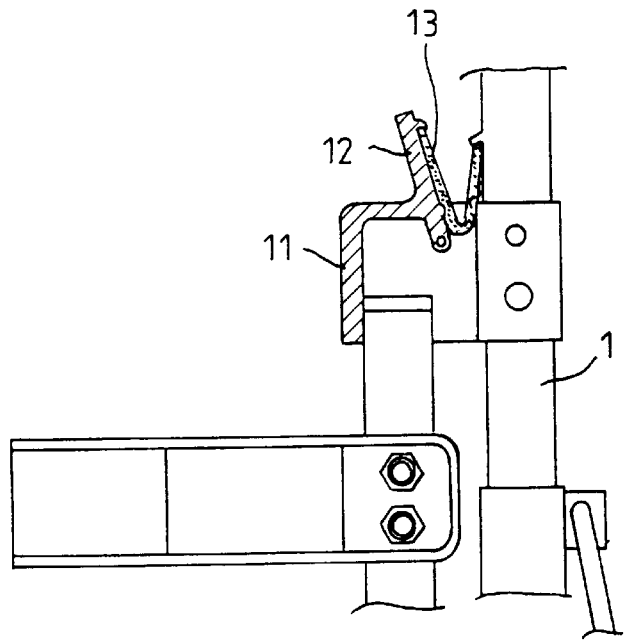
FIG. 1 is a cross-sectional front view of a conventional locking mechanism.
Figure 4:
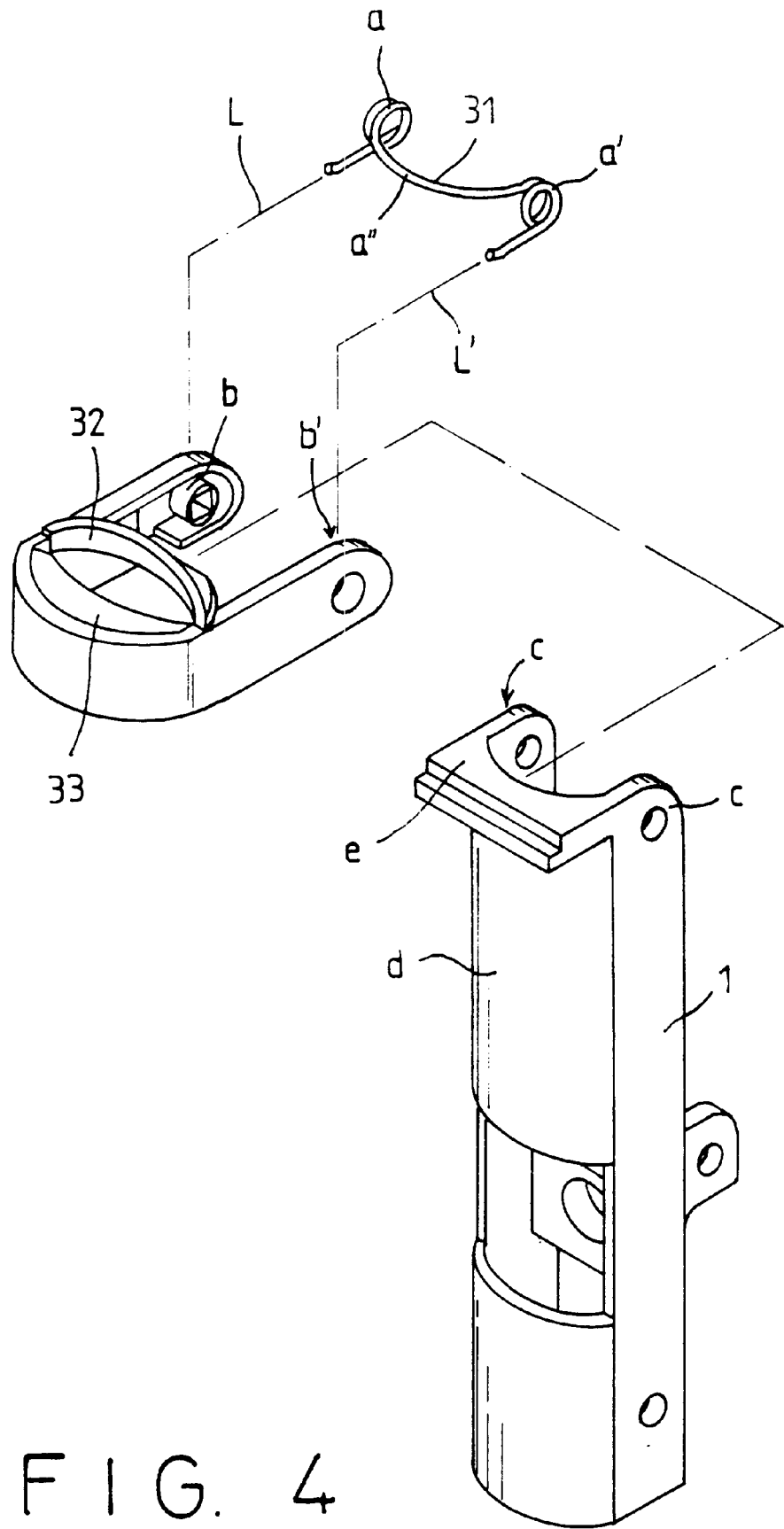
FIG. 4 is an exploded view partially illustrating the structure of the locking mechanism of FIG. 2.

The preferred embodiment of a locking mechanism according to the present invention is shown in FIGS. 2 through 4. The locking mechanism mainly comprises a retainer (3) pivotally attached to a handle bar (1) of a foldable golf cart. An engagement element (21) is disposed on the top of a support bar (2). The retainer (3) includes a spring (31) inside its interior, which spring can keep the retainer in a position perpendicular to the handle bar (1). The retainer (3) has an upper curved plate portion (32) and a lower curved plate portion (33). The engagement element (21) on the top of the support bar (2) has a recessed curved top surface that is substantially mated with the lower curved plate portion (33) of the retainer (3). Thus when the retainer (3) catches the engagement element (21), the lower curved plate portion (33) will abut against the recessed curved top surface of the engagement element (21), producing a tight and stable gripping.

The operation of the locking mechanism is as follows. To separate the retainer from the engagement element, a user can insert his or her fingers between the upper curved plate portion (32) and the lower curved plate portion (33) and then pull the upper curved plate portion (32) upwardly to disengage them. Then the golf cart can be folded. It is convenient for users to exert pulling force in a vertical direction. To develop a folded golf cart, users turn the handle bar (1) as shown in FIG. 5 and then the retainer (3) will automatically catch the engagement element (21). With an accurate matching between the lower curved plate portion (33) and the recessed curved top surface of the engagement element (21), the retainer (3) can positively hold the support bar (2). Hence, the invention can provide a stable coupling. When the golf cart is dragged on green, it will not come apart with ease.

Referring to FIGS. 4, 6, and 7, an operable coupling of the spring (31) to the retainer (3) and the bar (1) is illustratively shown. The spring (31) in the disclosed embodiment includes a pair of coiled portions (a, a') between which an arcuate intermediate portion (a") extends. The coiled portions (a, a') are clearly shown via broken reference lines (L, L') to be received within corresponding spaces (b, b') provided within laterally-extending side portions of the retainer (3). When the retainer (3) is coupled to the bar (1) as shown in FIG. 3, the coiled portions (a, a') of the spring (31) are each captured between respective ones of the retainer's side portion (b, b') and the bar's side surfaces (c, c'). The spring's intermediate portion (a") then extends transversely across and engages the bar's arcuate front surface (d) and overhanging flanged portion (e).

While hidden from view in the perspective angles shown in FIG. 3; FIG. 6 (shown with the bar's flanged portion (e) cut-away) and FIG. 7 illustrate the spring's position upon the bar (1) during the given assembly's use. With the retainer (3) properly positioned and a fastening member passed along the axis (X), the spring (31) is sufficiently retained to oppose any displacement of the retainer (3) relative to the bar (1).

From the above description, evidently the invention can reach the objects set forth at the beginning. We hereby apply for a patent grant.

What is claimed is:

1. A locking assembly for releasably locking together at least a pair of structural members of a collapsible golf cart comprising:

(a) an engagement element coupled to a first of the structural members, said engagement element having a recessed arcuate top surface;

(b) a retainer pivotally coupled to a second of the structural members to be pivotally displaceable relative thereto about a transverse axis between at least a locking angular position and a releasing angular position, said retainer having a pair of transversely opposed side portions and upper and lower arcuate plate portions extending from one said side portion to the other, said upper and lower arcuate plate portions defining an offset space therebetween, said lower arcuate plate portion engaging in substantially flush manner at least a portion of said recessed arcuate top surface of said engagement element when said retainer is disposed in said locking angular position;

(c) a spring member coupled to said retainer and the second structural member, said spring member resiliently biasing said retainer to said locking angular position relative to the second structural member.

2. The locking assembly as recited in claim 1 wherein said spring member is captured by said retainer against the second structural member.

3. The locking assembly as recited in claim 2 wherein said spring member includes a pair of transversely opposed coiled portions and an elongate intermediate portion extending therebetween, said coiled portions being respectively coupled to said side portions of said retainer, said intermediate portion engaging the second structural member.

4. The locking assembly as recited in claim 1 wherein each said upper and lower arcuate plate portion of said retainer is formed with a substantially bulbous contour.

* * * * *